(12) United States Patent
Saad et al.

(10) Patent No.: US 11,935,085 B1
(45) Date of Patent: Mar. 19, 2024

(54) ELECTRONIC SHOPPING CART PREDICTION AND CACHING OF ELECTRONIC SHOPPING CART COMPUTATIONS

(71) Applicant: Adobe Inc., San Jose, CA (US)

(72) Inventors: Michele Saad, Austin, TX (US); Igor Miniailo, Austin, TX (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/903,360

(22) Filed: Sep. 6, 2022

(51) Int. Cl.
*G06Q 30/02* (2023.01)
*G06Q 30/0207* (2023.01)
*G06Q 30/0601* (2023.01)

(52) U.S. Cl.
CPC ..... *G06Q 30/0222* (2013.01); *G06Q 30/0625* (2013.01)

(58) Field of Classification Search
CPC .......... G06Q 30/0222; G06Q 30/0625; G06Q 30/0207–30/0277
See application file for complete search history.

(56) References Cited

U.S. PATENT DOCUMENTS

| | | | | |
|---|---|---|---|---|
| 9,972,038 | B2 * | 5/2018 | Godsey | G06Q 30/0625 |
| 2002/0111873 | A1 * | 8/2002 | Ehrlich | G06Q 30/0633 |
| | | | | 705/80 |
| 2002/0156685 | A1 * | 10/2002 | Ehrlich | G06Q 30/0613 |
| | | | | 705/26.8 |
| 2009/0043674 | A1 * | 2/2009 | Minsky | G06Q 30/0603 |
| | | | | 715/765 |
| 2009/0234722 | A1 * | 9/2009 | Evevsky | G06Q 30/02 |
| | | | | 705/14.1 |
| 2010/0250336 | A1 * | 9/2010 | Selinger | G06Q 30/0643 |
| | | | | 705/26.7 |
| 2012/0323682 | A1 * | 12/2012 | Shanbhag | G06Q 30/0641 |
| | | | | 705/14.66 |

(Continued)

OTHER PUBLICATIONS

"Intent-Based Promotions", Namogoo, Retrieved from Internet URL : https://www.namogoo.com/platform/intent-based-promotions/, accessed on Aug. 18, 2022, pp. 15.

*Primary Examiner* — Thuy N Nguyen
(74) *Attorney, Agent, or Firm* — Shook, Hardy & Bacon L.L.P.

(57) ABSTRACT

Embodiments provide systems, methods, and computer storage media for prediction and computation of electronic shopping carts. In an example embodiment, for each interaction between an e-shopper and an e-commerce application, one or more predicted electronic shopping carts that represent a combination of items the e-shopper is likely to purchase are generated based on current items in the e-shopper's electronic shopping cart and recent interactions with the e-shopper. For some or all of the predicted electronic shopping carts (e.g., those with top predicted confidence levels), corresponding shopping cart computations (e.g., identifying application promotions, determining a price total for the items in the predicted shopping cart) are executed and cached prior to the e-shopping adding the predicted items. As such, a page configured to visualize the predicted electronic shopping cart with a value retrieved from the cached shopping cart computations (e.g., price total for the predicted electronic shopping cart) is generated.

20 Claims, 5 Drawing Sheets

(56) References Cited

U.S. PATENT DOCUMENTS

| | | | |
|---|---|---|---|
| 2014/0046794 A1* | 2/2014 | Vallery | G06Q 30/0631 |
| | | | 705/26.7 |
| 2015/0106181 A1* | 4/2015 | Kluth | G06Q 30/0222 |
| | | | 705/14.23 |
| 2015/0186978 A1* | 7/2015 | Prindle | G06Q 30/0617 |
| | | | 705/26.8 |
| 2015/0221016 A1* | 8/2015 | Schulz | G06Q 30/0631 |
| | | | 705/26.7 |
| 2016/0005070 A1* | 1/2016 | Burr | G06Q 30/0253 |
| | | | 705/14.51 |
| 2016/0239867 A1* | 8/2016 | Sinha | G06Q 30/0257 |
| 2016/0364758 A1* | 12/2016 | Achhra | G06Q 30/0601 |
| 2017/0147976 A1* | 5/2017 | Koch | G06Q 10/0833 |
| 2018/0097905 A1* | 4/2018 | Todasco | H04L 67/02 |
| 2018/0174188 A1* | 6/2018 | Wilkinson | G06Q 30/0242 |
| 2021/0090154 A1* | 3/2021 | Michaelson | G06Q 30/0643 |
| 2021/0263978 A1* | 8/2021 | Banipal | G06N 20/00 |
| 2022/0058516 A1* | 2/2022 | Sarin | G06N 7/01 |
| 2022/0114868 A1* | 4/2022 | Bronicki | G06Q 20/204 |
| 2022/0198483 A1* | 6/2022 | Furphy | G06Q 30/0223 |
| 2022/0222706 A1* | 7/2022 | Arora | G06Q 30/0256 |
| 2022/0245707 A1* | 8/2022 | Bathe | G06Q 30/0641 |
| 2023/0019454 A1* | 1/2023 | Jass | G06Q 30/0201 |
| 2023/0162258 A1* | 5/2023 | Das Gupta | G06Q 30/0633 |
| | | | 705/26.7 |
| 2023/0334521 A1* | 10/2023 | Raipati | G06F 16/24552 |

\* cited by examiner

ELECTRONIC SHOPPING CART PREDICTION AND CACHING OF ELECTRONIC SHOPPING CART COMPUTATIONS

BACKGROUND

An e-commerce platform is a software application that runs an e-commerce or online store in which buyers and sellers can browse for and purchase products or services. The software application may be hosted on a web or application server, with which client devices of the buyers and sellers may interact. E-commerce platforms and online stores can include features (implemented by the software application) such as an electronic shopping cart system, marketing, search engine optimization, and/or catalog-management tools. In some cases, online merchants use e-commerce platforms to create and customize the look, content, and functionality of their online stores to provide e-commerce services to their own customers.

Scaling an e-commerce platform or online store to handle large merchants is a challenging table stakes problem. In some cases, scalability and performance can be improved within certain components of an e-commerce platform or online store, such as by adjusting indexation strategies for faster reads and writes, refactoring code to increase parallelization, upscaling hardware requirements, and so on. However, performance issues (e.g., delays) can still manifest in several ways at the merchant and shopper level. One way that conventional e-commerce platforms and stores often lag in performance is in the time it takes to update electronic shopping carts, especially when cart size increases to a few hundred items, a scenario that is quite common for large merchants.

SUMMARY

Embodiments of the present disclosure are directed to prediction and computation of electronic shopping carts. In an example embodiment, for each interaction between an e-shopper and an e-commerce application, one or more predicted electronic shopping carts that represent a predicted combination of items the e-shopper is likely to purchase are generated based on current items in the e-shopper's electronic shopping cart and recent interactions with the e-shopper. For some or all of the predicted electronic shopping carts (e.g., those with top predicted confidence levels), corresponding shopping cart computations (e.g., identifying application promotions, determining a price total for the items in the predicted shopping cart) are executed and cached prior to the e-shopping adding the predicted items. As such, in various embodiments, the cached shopping cart computations are used to reduce the time it takes to respond to e-shopper commands and/or generate pages associated with a predicted electronic shopping cart.

In an example embodiment, a page is generated (e.g., during browsing, during checkout), where the page is configured to visualize a predicted electronic shopping cart with a value retrieved from the cached shopping cart computations (e.g., a price total for the predicted electronic shopping cart). In one example, the page includes a carousel, panel, list or other representation of different predicted electronic shopping carts, where the e-shopper can scroll through the different predicted electronic shopping carts represented in the carousel. In some embodiments, each predicted electronic shopping cart (e.g., in a carousel) is presented with one or more values that were retrieved from the shopping cart computations, such as a representation of the predicted combination of items in that predicted electronic shopping cart, price total for the items in that predicted electronic shopping cart, any promotions applied, amount saved, taxes, deltas from the current cart contents (e.g., additional items that would be added), and/or the like. Additionally or alternatively, each predicted electronic shopping cart (e.g., in the carousel) is configured to pop-up one or more values that were retrieved from the cached shopping cart computations, for example, in response to input hovering over a corresponding predicted electronic shopping cart represented in the carousel.

In another example embodiment, one or more predicted electronic carts are generated in response to each interaction in a sequence of interactions between an e-shopper and an e-commerce application, and shopping cart computations are executed and cached for some or all of the predicted electronic carts. As such, when the e-shopper subsequently adds a predicted item(s) to his or her electronic shopping cart, thereby modifying the electronic shopping cart to correspond to a previously predicted electronic shopping cart, a determination is made not to re-compute the corresponding shopping cart computations since they were previously executed and cached. In another example, when the e-shopper subsequently adds the predicted item(s) to his or her electronic shopping cart and/or inputs a command to view the electronic shopping cart, the corresponding cached shopping cart computations are retrieved and used to generate a page that summarizes the contents of the electronic shopping cart. Since the applicable shopping cart computations were previously executed, the time it takes to respond to the e-shopper command is reduced over prior techniques.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present disclosure is described in detail below with reference to the attached drawing figures, wherein.

DETAILED DESCRIPTION

Overview

Figure 1:
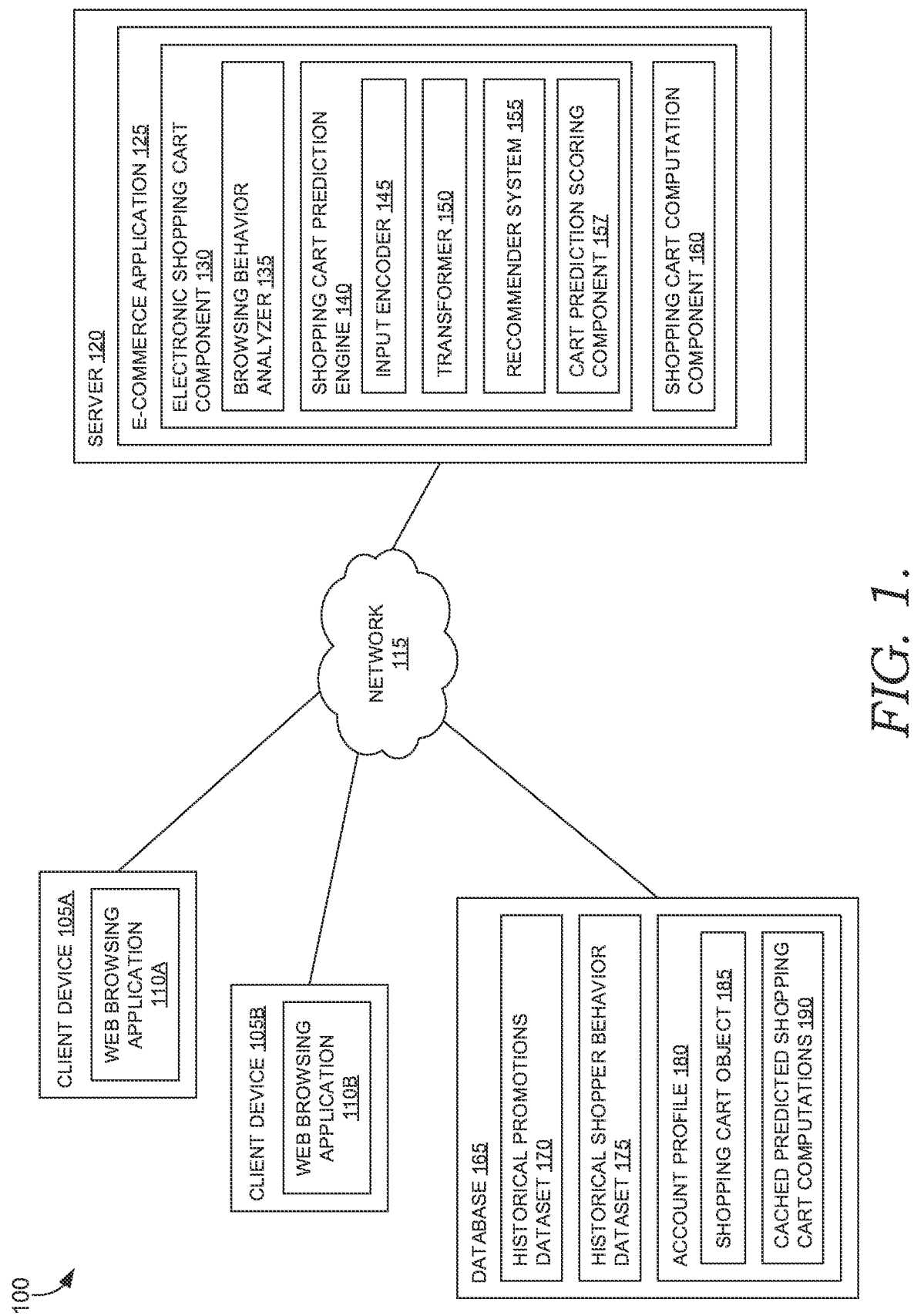
FIG. 1 is a block diagram of an example computing system suitable for prediction and computation of electronic shopping carts, in accordance with embodiments of the present disclosure.

When browsing an e-commerce or online store, e-commerce shoppers (e-shoppers) typically run searches for products or services, browse webpages or listings of product or service offerings, and add desired products or services to their electronic shopping cart. When the e-shopper is ready to checkout, the e-commerce or online store usually provides an icon or link to view the electronic shopping cart and begin the checkout process. In some conventional electronic cart systems, the price total for the items in the cart is not updated until the e-shopper clicks on the electronic shopping cart icon or link, upon which the cart is updated by identifying and applying applicable promotions to determine an updated price total for the items in the cart.

In many cases, particularly in the context of business-to-business (B2B) e-commerce where businesses exchange products or services with one another, e-shoppers often add hundreds of items to their electronic shopping carts. However, the computational complexity in the computation of electronic shopping carts (e.g., determining an updated price total) grows exponentially with the number of items the electronic shopping cart. This exponential relationship arises due to a number of factors. Often times, determining an updated price total depends on a multitude of electronic shopping cart rules that may have been activated by a merchant. Examples of electronic shopping cart rules include shipping cost discounts or waivers and promo codes that unlock various types of discounts when certain cart conditions are met. These electronic shopping cart rules are typically a function of customer group, product categor(ies), available promo codes, whether a customer is logged in or not, and/or other factors. As the number of items in an electronic shopping cart grows, the computation of an electronic shopping cart can result in a combinatorial explosion, as the computation typically involves evaluating various electronic shopping cart rules that require iterating through the items added to the cart and determining whether certain combinations are present (e.g., in applying buy-one-get-one free or minimum spending thresholds for free shipping rules). As a result, conventional e-commerce platforms and online stores require substantial computing resources and processing time to update electronic shopping carts.

Due to these computational demands, conventional systems typically do not compute electronic shopping carts (e.g., determine an updated price total) until the e-commerce customer (e-shopper) inputs a command to view his or her cart. In some conventional systems, once the e-shopper loads his or her cart, applicable promotional offers are identified based on the contents of the customer's cart, and the identified promotions are presented along with a summary of the items in that customer's cart. However, the conventional systems typically do not compute an updated price total that assumes a recommended promotion has been applied to the contents of the customer's cart, and instead waits until the customer chooses to apply a recommended promotion before computing an updated price total. As described above, as the number of items in an e-shopper's cart increases, so does the time it takes to determine an updated price total, and so does the delay between the e-shopper's command and when the electronic shopping cart interface is updated on the e-shopper's device.

In many cases, delays in the time it takes to compute an updated electronic shopping cart can lead to cart abandonment, which essentially wastes the computational resources that were used to update the electronic shopping cart before it was abandoned, as well as the computational resources that were used to host the e-shopper's interactions with the e-commerce platform or online store that occurred before cart abandonment. As a result, there is a need for improved electronic shopping cart systems that reduce the delay time between when an e-shopper inputs a command to view his or her cart and when the e-commerce platform or online store actually presents the contents, applied promotions, and price total for that customer's electronic shopping cart on his or her device.

Accordingly, embodiments of the present disclosure are directed to improved techniques for electronic shopping cart computation. In some embodiments, a shopping cart prediction engine runs as a background process while an e-shopper interacts with an e-commerce platform or online store. The shopping cart prediction engine predicts potential electronic shopping carts (e.g., including one or more predicted items the e-shopper is likely to add), and a shopping cart computation component pre-computes electronic shopping cart computations (e.g., including applicable promotions and corresponding price totals) for predicted electronic shopping carts that have predicted confidence levels above a threshold. In some embodiments, electronic shopping cart computations for predicted electronic shopping carts are executed and cached in advance of the action of adding-to-cart. As a result, in some embodiments in which an e-shopper inputs a command that would update his or her electronic shopping cart to a predicted electronic shopping cart (e.g., by adding an item that was previously predicted), or inputs a command to view a predicted electronic shopping cart (e.g., a recommend shopping electronic shopping cart, a current electronic shopping cart that corresponds to a previously predicted electronic shopping cart), a corresponding cached electronic shopping cart computation is retrieved, used to generate a corresponding page, and/or loaded on the e-shopper's device without the delay that otherwise would have been required to compute the electronic shopping cart in response to the command.

In some embodiments, a shopping cart prediction engine accepts as input a representation of an e-shopper's recent browsing behavior and the current contents of the e-shopper's electronic shopping cart, and predicts one or more items the e-shopper is likely to add to the cart. In some embodiments, the shopping cart prediction engine uses a recommender system that includes a collaborative, content-based, and/or hybrid filter, a machine learning model (e.g., a neural network); and/or other techniques to predict the added items. In an example implementation, the shopping cart prediction engine is trained on historical data to predict one or more added items and/or a combination of items that is most likely to result in conversion, for example, based on an e-shopper's recent browsing behavior and its similarity to historical scenarios (e.g., learned via a collaborative filter or a hybrid content-based and collaborative filter type recommender system).

In some embodiments, the shopping cart prediction engine uses a recommender system to generate, for each item in a catalog, a compatibility score quantifying compatibility between that item and the current contents of the e-shopper's electronic shopping cart, and the shopping cart prediction engine applies a (manually set or dynamically determined) threshold compatibility score to predict a much smaller subset of catalog items that might be associated with the current contents of the e-shopper's electronic shopping cart. Depending on the implementation, the compatibility score is a neural network prediction, a composite representation of the distances between the embedding of each item in the cart and each other item in the catalog, and/or other types of scores. In some embodiments, the shopping cart prediction engine uses the current contents of the e-shopper's electronic shopping cart and the subset of predicted associated catalog items to generate different possible combinations of items that add one or more of the predicted associated catalog items to the current contents of the e-shopper's electronic shopping cart, and generates a cart combination score for each combination. A non-limiting example cart prediction score quantifies similarity (e.g. cosine similarity) between embeddings for each pair of the different items in the cart and combines pairwise similarity scores to generate a cart combination score for the entire cart. As such, the shopping cart prediction engine identifies predicted electronic shopping carts representing different predicted combinations of items the e-shopper is likely to purchase together and corresponding cart prediction scores (e.g., which can be understood as quantifying confidence levels of corresponding predicted shopping carts).

In an example implementation, the shopping cart prediction engine runs in the background while an e-shopper interacts with an e-commerce platform or online store, for example, generating predicted electronic shopping carts and corresponding cart prediction scores with each updated e-shopper interaction. In some embodiments, the shopping cart prediction engine generates predictions based on a determination that computational resources are available in the background during e-shopper browsing and/or based on a determination that a predicted electronic shopping cart has been predicted with at least a threshold cart prediction score. As such, in applicable scenarios, one or more of the predicted electronic shopping carts (e.g., a fixed number of electronic shopping carts having the top N cart prediction scores, a variable number of electronic shopping carts having prediction scores above a threshold) are computed (e.g., by performing a real-time inventory check, identifying and applying applicable promotions, computing corresponding price totals), and the results are cached. In some embodiments, computations for different predicted electronic shopping carts are executed in parallel on different processors. In some embodiments, these cached shopping cart computations are cleared and/or overwriting is permitted upon cart abandonment, after some number or duration of e-shopper interactions (e.g., once the e-shopper has visited 5 or 10 websites), and/or otherwise.

In some embodiments, an e-commerce platform or online store uses cached shopping cart computations to present predicted electronic shopping carts as recommendations with a representation of corresponding applied promotions and resulting price totals. In an example implementation, a user interface on the e-shopper's device presents a carousel, panel, list or other representation of different predicted electronic shopping carts, where each predicted electronic shopping cart (e.g., in the carousel) is, or is associated with, an interaction element that (e.g., upon hovering over or tapping on that element, presents a pop-up that) displays a representation of the predicted combination of items in that predicted electronic shopping cart, price total for the items in that predicted electronic shopping cart, any promotions applied, amount saved, taxes, deltas from the current cart contents (e.g., additional items that would be added), and/or the like. Upon selecting an option to use a predicted electronic shopping cart, the user interface transitions to a check-out interface that displays a cart summary, relying on the corresponding cached shopping cart computations, and the e-shopper is free to complete the purchase.

As such, using implementations described herein, potential electronic shopping carts are predicted based on an e-shopper's current electronic shopping cart contents, and corresponding electronic shopping cart computations are executed and cached prior to the e-shopper adding predicted items to his her or cart. By pre-computing predicted shopping carts and caching these anticipated computations, various embodiments effectively execute electronic shopping cart computations asynchronously (e.g., independent of e-shopper commands to view a predicted cart) and reduce the delay between when an e-shopper inputs a command to view a predicted cart and when the e-commerce platform or online store actually presents the corresponding contents, applied promotions, and price total. By reducing this delay, various embodiments reduce or minimize instances of cart abandonment and the corresponding wasted computational resources that were used to update the electronic shopping cart before it was abandoned, as well as the computational resources that were used to host the e-shopper's interactions with the e-commerce platform or online store before the abandonment. Furthermore, embodiments that offer e-shoppers the ability to visualize a comparison of predicted electronic shopping carts (e.g., including cart contents, promotions applied, and total cost) serve to significantly aid in a shopper's decision making, speeding up the shopper journey towards conversion and effectively reducing browsing interactions and corresponding computational demands to host those interactions.

Having briefly described an overview of aspects of the present disclosure, various terms used throughout this description are provided. Although more details regarding various terms are provided throughout this description, general descriptions of some terms are included below to provider a clearer understanding of the ideas disclosed herein:

An electronic shopping cart is a software application, module, object, or other component that stores a representation of catalog items (e.g., products or services) added by an e-shopper. In some scenarios, an electronic shopping cart is associated with an account or otherwise shared by multiple e-shoppers. As used herein, an electronic shopping cart computation refers to the process of performing a real-time inventory check, identifying applicable promotions, applying the promotions, and/or computing a resulting price total for the items in the electronic shopping cart.

As used herein, a predicted electronic shopping cart refers to a predicted combination of items (e.g., products, services) in an electronic shopping cart, including one or more items that an e-shopper is predicted to add, or that are predicted to be compatible with current contents of an electronic shopping cart.

A recommender system is software that recommends products, services, or content. In the context of e-commerce, recommender systems recommend products or services based on an e-shopper's recent behavior, current electronic shopping cart, and/or other factors. Some recommender systems rely on machine learning techniques, such as a neural network, to make recommendations. Recommender systems that use content-based filtering make recommendations based on similarities in products or services and based on information about or preferences of the browsing e-shopper. Recommender systems that use collaborative filtering make recommendations based on information about or preferences of other users who are determined to be similar to the browsing e-shopper. Recommender systems that use hybrid filtering combine strategies such as content-based and collaborative filtering to make recommendations.

A neural network is a machine-learning model that learns to approximate unknown functions by analyzing example (e.g., training) data at different levels of abstraction. Generally, neural networks can model complex non-linear relationships by generating hidden vector outputs along a sequence of inputs. In particular, a neural network can include a model of interconnected digital neurons that communicate and learn to approximate complex functions and generate outputs based on a plurality of inputs provided to the model. A neural network can include a variety of deep learning models, including convolutional neural networks, recurrent neural networks, deep neural networks, and deep stacking networks, to name a few examples. A neural network may include or otherwise make use of one or more machine learning algorithms to learn from training data. In other words, a neural network can include an algorithm that implements deep learning techniques such as machine learning to attempt to model high-level abstractions in data. An example implementation may include a convolutional neural network including convolutional layers, pooling layers, and/or other layer types.

Example E-Commerce Environment

Referring now to FIG. 1, a block diagram of example environment 100 suitable for use in implementing embodiments of the present disclosure is shown. Generally, environment 100 is suitable for hosting an e-commerce platform or online store, and, among other things, facilitates prediction and computation of electronic shopping carts. At a high level, environment 100 includes client devices 105A, 105B, server 120, and database 165.

Depending on the implementation, client devices 105A, 105B, and/or server 120 are any kind of computing device capable of facilitating prediction and computation of electronic shopping carts. In an embodiment, client devices 105A, 105B, and/or server 120 are each a computing device such as computing device 500 of FIG. 5. In some embodiments, client devices 105A, 105B, and/or server 120 are a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In various implementations, the components of environment 100 include computer storage media that stores information including data, data structures, computer instructions (e.g., software program instructions, routines, or services), and/or models (e.g., machine learning models) used in some embodiments of the technologies described herein. For example, in some implementations, client devices 105A, 105B, server 120, and/or database 165 comprises a data store (or computer data memory). Further, although client devices 105A, 105B, server 120, and database 165 are each depicted as a single component in FIG. 1, in some embodiments, client devices 105A, 105B, server 120, and/or database 165 are implemented using any number of data stores (e.g., using local and/or cloud storage), and/or any data or components described herein are stored on any suitable data store(s) and any suitable device(s).

In the example illustrated in FIG. 1, the components of environment 100 communicate with each other via a network 115. In some non-limiting example implementations, network 115 includes one or more local area networks (LANs) and/or wide area networks (WANs). Such networking environments are commonplace in offices, enterprise-wide computer networks, intranets, and the Internet.

In the example illustrated in FIG. 1, client devices 105A and 105B include a corresponding web browsing application 110A and 110B, and server 120 includes an e-commerce application 125. In an example embodiment, e-commerce application 125 includes code for an e-commerce platform and/or online store, server 120 is a web or application server that hosts e-commerce application 125, and web browsing applications 110A and 110B (or some other client application or application programming interface) on client devices 105A and 105B communicate with e-commerce application 125 to navigate, download, render, and manage e-shopping interactions with one or more pages of one or more e-commerce stores. In some embodiments, application code and/or web pages executed by client devices 105A, 105B, web browsing applications 110A, 110B, server 120, and/or e-commerce application 125 (e.g., some or all of the elements illustrated in FIG. 1) may be incorporated or integrated into an application(s), or an add-on(s) or plug-in(s) to an application(s). In some embodiments, the application(s) is a stand-alone application, a mobile application, a web application, or the like. For example, in some implementations, the application(s) comprises a web application that runs in a web browser and/or is hosted at least partially server-side. In some cases, the application is integrated into an operating system (e.g., as a service). One example application that may be used is ADOBE Commerce, which is an e-commerce platform allows e-merchants to build and host online stores for e-shoppers. Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In the example illustrated in FIG. 1, web browsing application 110A or 110B communicates with e-commerce application 125 to execute the functionality described herein. In another example, web browsing application 110A or 110B and e-commerce application 125 (or some portion thereof) are integrated into a common application executable on a single device. In yet another example, web browsing application 110A or 110B and e-commerce application 125 (or some portion thereof) are distributed across some other number and/or type(s) of devices. These are just examples, and any suitable allocation of functionality among these or other devices is possible within the scope of the present disclosure.

To begin with a high-level overview of an example workflow through the configuration illustrated in FIG. 1, an e-shopper operating client device 105A uses web browsing application 110A to navigate to an online store hosted by e-commerce application 125 at a particular web address identified by the e-shopper via the web browsing application 110A. The web browsing application 110A sends a request to server 120 via network 115 to download the webpage located at that web address, server 120 routes the request to e-commerce application 125, which generates (or locates) and returns the web page (and any supporting files) to web browsing application 110A, which renders the web page for the online store on client device 105A. As such, the e-shopper can browse and interact with different pages of the online store, add items to his or her electronic cart, and check out to purchase the items.

In the implementation illustrated in FIG. 1, e-commerce application 125 includes an electronic shopping cart component 130 that tracks items (e.g., products, services) added to an electronic shopping cart associated with a particular account. In an example implementation, database 165 stores an account profile 180 for each account, where account profile 180 includes a shopping cart object 185 that stores a representation of the items added to the electronic shopping cart associated with account profile 180, and electronic shopping cart component 130 manages shopping cart object 185. In some cases, an e-shopper logs into an account managed by e-commerce application 125 and represented by account profile 180. When the e-shopper inputs a command to add an item to his or her electronic shopping cart on web browsing application 110A, web browsing application 110A sends the instruction to electronic shopping cart component 130, which updates shopping cart object 185 to include a representation of the added item. In some cases, an account is shared among multiple e-shoppers, in which case, electronic shopping cart component 130 updates shopping cart object 185 based on an instruction received from an e-shopper operating any client device. In some cases in which an e-shopper has not logged into his or her account, electronic shopping cart component 130 assigns a guest account to the e-shopper and tracks items added to that guest account's electronic shopping cart. In some embodiments, the e-shopper can check out using the guest account, or login to an existing account, in which case electronic shopping cart component 130 moves the items from the guest account's electronic shopping cart to the electronic shopping cart associated with the e-shopper's existing account.

In the example implementation illustrated in FIG. 1, electronic shopping cart component 130 includes browsing behavior analyzer 135, shopping cart prediction engine 140, and shopping cart computation component 160. At a high level, as an e-shopper downloads and interacts with web pages, web browsing application 110A generates and sends corresponding requests to e-commerce application 125, which passes a representation of those commands to browsing behavior analyzer 135. Browsing behavior analyzer 135 computes and tracks the e-shopper's browsing behavior (e.g., page visit duration, click locations, duration between clicks, number of times that e-shopper has visited a page or online store, etc.), and generates and passes a representation of the e-shopper's browsing behavior to shopping cart prediction engine 140, which predicts one or more electronic shopping carts based on the representation of the e-shopper's browsing behavior and the current contents of the e-shopper's electronic shopping cart (e.g., as represented by shopping cart object 185). For each predicted electronic shopping cart (e.g., predicted with a cart prediction score or confidence level above a threshold), shopping cart computation component 160 computes a corresponding electronic shopping cart (e.g., by performing a real-time inventory check, identifying applicable promotions, calculating a price total for the items in the cart based on the applicable promotions, calculating amount saved, taxes, deltas, etc.) and caches the results in database 165 as cached predicted shopping cart computations 190 associated with account profile 180 for that e-shopper. As such, depending on the implementation, e-commerce application 125 uses cached predicted shopping cart computations 190 to generate and/or serve a page that represents one or more predicted electronic shopping carts, any promotions applied, amount saved, taxes, deltas from the current cart contents (e.g., additional items that would be added), and/or the like.

In some embodiments, browsing behavior analyzer 135 computes and tracks the e-shopper's browsing behavior (e.g., page visit duration, click locations, duration between clicks, number of times that e-shopper has visited a page or online store, etc.) using any known technique, and generates and/or passes a representation of the e-shopper's browsing behavior to shopping cart prediction engine 140. The form (e.g., dimensionality, assignment of browsing behavior features to corresponding positions or dimensions) of the representation will depend on the implementation (e.g., of shopping cart prediction engine 140). In the embodiment illustrated in FIG. 1, shopping cart prediction engine 140 includes input encoder 145, transformer 150, and recommender system 155. In some such embodiments, browsing behavior analyzer 135 tracks and generates a representation of the e-shopper's browsing behavior, input encoder 145 generates an encoded representation of the e-shopper's browsing behavior (e.g., a time series signal, a vector), and transformer 150 includes a transformer architecture that converts the encoded representation of the e-shopper's browsing behavior to a format that recommender system 155 understands (e.g., a fixed length signal that represents the e-shopper's browsing behavior).

In a non-limiting example implementation, browsing behavior analyzer 135 and/or input encoder 145 generate a time series signal that encodes one or more interaction features for each e-shopper interaction (e.g., page visit duration, click location, click target ID, duration between clicks, etc.), generating an encoded sequential signal with any number of time positions corresponding to any number of sequential e-shopper interactions (e.g., a variable number, the most recent N interactions, the most recent N available interactions), where each time position in the signal encodes one or more interaction features for a corresponding e-shopper interaction. In some embodiments, transformer 150 uses any known transformer architecture to convert the time series signal to a corresponding fixed length signal, and feeds the fixed length signal (or a representation thereof) into recommender system 155. In another example, implementation, browsing behavior analyzer 135, input encoder 145, and/or transformer 150 generate a vector in which each position (or a combination of positions) encodes a corresponding interaction feature, and the vector (or a representation thereof) is fed into recommender system 155. Furthermore, in some embodiments, input encoder 145 and/or transformer 150 looks up and generates a presentation of the contents of the e-shopper's electronic shopping cart (e.g., from shopping cart object 185) using any known content embedding technique, generates a combined representation that encodes the contents of the e-shopper's electronic shopping cart and the e-shopper's recent browsing behavior, and feeds the combined representation into recommender system 155. These are just a few example implementations, and other ways of encoding e-shopper interactions and cart contents may be implemented within the scope of the present disclosure.

Shopping cart prediction engine 140 uses recommender system 155 to predict one or more electronic shopping carts (e.g., including one or more predicted items the e-shopper is likely to add) that are likely to result in conversion. In some embodiments, recommender system 155 predicts one or more items the e-shopper is likely to add to the cart based on input representing the e-shopper's recent browsing behavior and the current contents of the e-shopper's electronic shopping cart. In some embodiments, recommender system 155 includes a collaborative, content-based, and/or hybrid filter, a machine learning model (e.g., a neural network); and/or other techniques to predict the added items. In an example implementation, recommender system 155 is trained on historical promotions dataset 170 and/or historical shopper behavior dataset 175 to predict one or more added items and/or a corresponding combination of items that is most likely to result in conversion. In some such cases, recommender system 155 identifies one or more additional catalog items based on similarity (e.g., learned via a collaborative or hybrid filter) between an encoded representation of an e-shopper's recent browsing history and corresponding encoded historical e-shopper browsing activity (stored in historical shopper behavior dataset 175 and/or historical promotions dataset 170) that led to historical purchases of a set of corresponding items. In this case, recommender system 155 identifies one or more encoded historical e-shopper browsing activity sessions that match closest to the current e-shopper's browsing activity and cart contents for the current session, and identifies the historical electronic shopping cart (items that were purchased together) in each of the one or more closest matching historical e-shopper browsing activity sessions as a predicted electronic shopping cart for the current e-shopper.

In some embodiments, recommender system 155 generates, for each item in a catalog, a compatibility score that quantifies compatibility between that item and the current contents of the e-shopper's electronic shopping cart, and recommender system 155 applies a (manually set or dynamically determined) threshold compatibility score to predict a much smaller subset of catalog items that might be associated with the current contents of the e-shopper's electronic shopping cart. In an example implementation, recommender system 155 includes one or more neural networks that predict a compatibility score based on encoded representations of the cart contents and a target catalog item (e.g., encoded using any known content embedding technique). Additionally or alternatively, recommender system 155 uses a collaborative or hybrid filter to predict a compatibility score based on encoded representations of the cart contents and a target catalog item. In some cases, recommender system 155 generates a compatibility score to quantify compatibility between the embedding of each item in the cart and each other item in the catalog, and recommender system 155 generates a composite representation of all those resulting compatibility scores (e.g., combining compatibility scores using any known technique such as averaging). As such, in some embodiments, recommender system 155 generates a compatibility score for each item in a catalog that is not already in an electronic shopping cart, and filters out catalog items that have compatibility scores than a designated threshold to identify a subset of predicted catalog items that may be associated with the current cart contents.

In some embodiments, recommender system 155 uses the current contents of the e-shopper's electronic shopping cart and the subset of predicted associated catalog items to generate different possible combinations of items that add one or more of the predicted associated catalog items to the current contents of the e-shopper's electronic shopping cart, and cart prediction score component 157 generates a cart combination score for each combination (which represents a predicted electronic shopping cart). In an example implementation, cart prediction score component 157 generates a cart prediction score that quantifies similarity (e.g. cosine similarity) between embeddings for each pair of the different items in the cart and combines pairwise similarity scores to generate a cart combination score for the entire predicted electronic shopping cart. As such, recommender system 155 (or some other component) identifies predicted electronic shopping carts representing different predicted combinations of items the e-shopper is likely to purchase together, and cart prediction score component 157 generates corresponding cart prediction scores (e.g., which can be understood as quantifying confidence levels of corresponding predicted shopping carts). These are just a few examples, and other techniques for predicting electronic shopping carts are contemplated within the scope of the present disclosure.

Shopping cart computation component 160 executes shopping cart computations (e.g., performing a real-time inventory check, identifying one or more applicable promotions, computing cart total that accounts for applicable promotions, computing amount saved, taxes, deltas from the current cart contents, etc.) for one or more predicted electronic shopping carts (e.g., one or more top predicted electronic shopping carts with corresponding cart prediction scores above a threshold). Depending on the implementation, shopping cart computation component 160 uses any known technique identify applicable promotions, but identifies applicable promotions that are applicable to the contents of a predicted electronic shopping cart. In some embodiments, shopping cart computation component 160 identifies promotions as applicable based on e-shopper characteristics (e.g., customer group, online browsing behavior, similarity to other customer groups), the current contents of the e-shopper's electronic shopping cart, and/or other factors. Additionally or alternatively, depending on the implementation, shopping cart computation component 160 uses any known technique to compute a price total based on applicable promotions, but does so for the contents of a predicted electronic shopping cart. In some cases, shopping cart computation component 160 executes shopping cart computations for a designated number of top predicted electronic shopping carts. Additionally or alternatively, shopping cart computation component 160 executes shopping cart computations for one or more predicted electronic shopping carts (or chooses a number of predicted electronic shopping carts to compute) based on a determination that there are available computational resources (e.g., available to e-commerce application 125) on server 120 (or some other component) to execute the computations.

In some embodiments, the shopping cart prediction engine 140 runs in the background while an e-shopper interacts with e-commerce application 125, generating predicted electronic shopping carts and corresponding cart prediction scores with each updated e-shopper interaction, and shopping cart computation component 160 executes shopping cart computations for one or more predicted electronic shopping carts associated with each e-shopper interaction (e.g., determining not to re-execute shopping cart computations for previously predicted electronic shopping carts). As such, shopping cart computation component 160 generates and caches shopping cart computations (e.g., as cached predicted shopping cart computations 190). In some embodiments, shopping cart computation component 160 executes (or triggers execution of) computations for different predicted electronic shopping carts in parallel on different processors. In some embodiments, shopping cart computation component 160 deletes, overwrites, and/or designates cached predicted shopping cart computations 190 for overwriting upon cart abandonment, after some number or duration of e-shopper interactions (e.g., once the e-shopper has visited 5 or 10 websites), and/or otherwise.

As such, depending on the implementation, e-commerce application 125 uses cached predicted shopping cart computations 190 to generate and/or serve a page that represents one or more predicted electronic shopping carts, any promotions applied, amount saved, deltas from the current cart contents (e.g., additional items that would be added), and/or the like. For example, in some embodiments, when electronic shopping cart component 130 receives a command to add an item to the e-shopper's electronic shopping cart (or a command to view a electronic shopping cart), electronic shopping cart component 130 compares the new item and/or the resulting combination of items to the predicted electronic shopping carts (e.g., represented in cached predicted shopping cart computations 190), and determines whether the resulting combination of items corresponds to predicted electronic shopping cart. If so, electronic shopping cart component 130 relies on corresponding cached predicted shopping cart computations 190 instead of executing the computations on demand.

In another example implementation, when an e-shopper adds an item to his or her electronic shopping cart, electronic shopping cart component 130 determines whether the resulting combination of items corresponds to a predicted electronic shopping cart, and if not, executes and caches corresponding shopping cart computations so when the e-shopper (or someone else associated with the same account) clicks to view the electronic shopping cart, the computations have already been executed and can simply be retrieved.

In some embodiments, e-commerce application 125 uses cached predicted shopping cart computations 190 to generate a page (e.g., during browsing, during checkout), that presents one or more predicted electronic shopping carts as recommendations with a representation of corresponding applied promotions and resulting price totals. In an example implementation, the page is configured to cause web browsing application 110A to presents a carousel, panel, list or other representation of different predicted electronic shopping carts, where each predicted electronic shopping cart (e.g., in the carousel) is or is associated with an interaction element that (e.g., upon hovering over or tapping on that element, presents a pop-up that) displays a representation of the predicted combination of items in that predicted electronic shopping cart, price total for the items in that predicted electronic shopping cart, any promotions applied, amount saved, deltas from the current cart contents (e.g., additional items that would be added), and/or the like. Upon selecting an option to use a predicted electronic shopping cart, web browsing application 110A retrieves and renders a check-out interface that displays a cart summary, relying on corresponding cached predicted shopping cart computations 190, and the e-shopper is free to complete the purchase.

Figure 2:
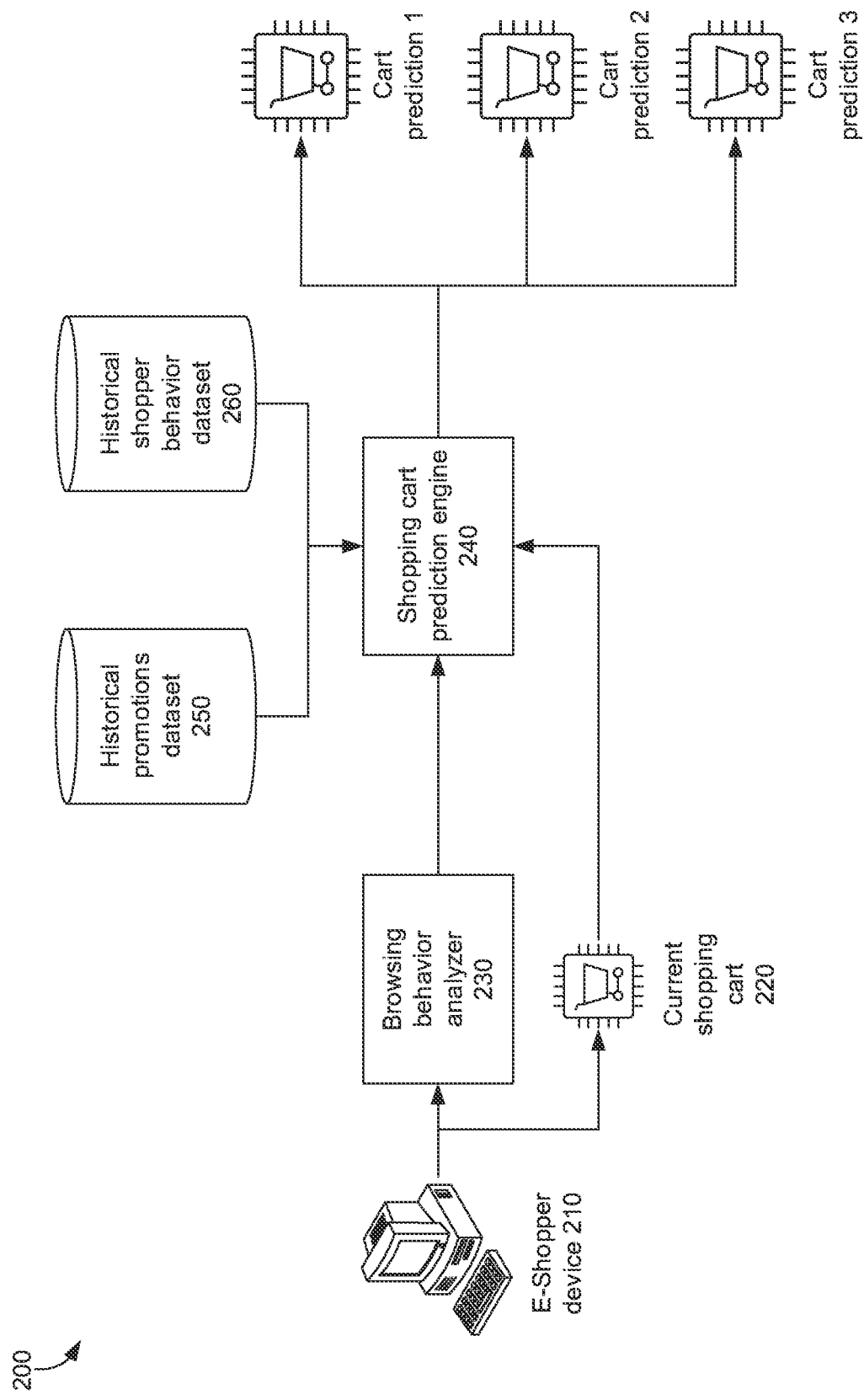
FIG. 2 is a data flow diagram illustrating an example electronic shopping cart prediction and computation system, in accordance with embodiments of the present disclosure.

FIG. 2 is a data flow diagram illustrating an example electronic shopping cart prediction and computation system 200, in accordance with embodiments of the present disclosure. FIG. 2 illustrates e-shopper device 210 (e.g., which corresponds with client device 105A or 105B of FIG. 1, in some embodiments), browsing behavior analyzer 230 (e.g., which corresponds with browsing behavior analyzer 135 of FIG. 1, in some embodiments), shopping cart prediction engine 240 (e.g., which corresponds with shopping cart prediction engine 140 of FIG. 1, in some embodiments), current shopping cart 220 (e.g., which corresponds with shopping cart object 185 of FIG. 1, in some embodiments), historical promotions dataset 250 (e.g., which corresponds with historical promotions dataset 170 of FIG. 1, in some embodiments), and historical shopper behavior dataset 260 (e.g., which corresponds with historical shopper behavior dataset 175 of FIG. 1, in some embodiments).

In FIG. 2, an e-shopper using e-shopper device 210 browses an e-commerce or online store, adding items to his or her current shopping cart 220. As the e-shopper browses (e.g., at each interaction), browsing behavior analyzer 230 generates a representation of a sequence of the e-shopper's preceding (e.g., N) interactions. Shopping cart prediction engine 240 accepts as input, representation(s) of the e-shopper's interactions and of the contents of current shopping cart 220, and from this input, predicts one or more items the e-shopper is likely to add to the cart. In an example embodiment, shopping cart prediction engine 240 is trained on historical promotions dataset 250 and/or historical shopper behavior dataset 260 to predict one or more added items and/or a corresponding combination of items that is most likely to result in conversion, based on similarity (e.g., learned via a collaborative or hybrid filter) between the e-shopper's interactions and corresponding historical e-shopper browsing activity stored in historical shopper behavior dataset 260 and/or historical promotions dataset 250 that led to historical purchases of a set of corresponding items. As such, in some embodiments, shopping cart prediction engine 240 identifies one or more encoded historical e-shopper browsing activity sessions that match closest to the current e-shopper's recent interactions and current shopping cart 220 contents. In some embodiments, shopping cart prediction engine 240 identifies the historical electronic shopping cart (the set of items that were purchased together) in the top N closest matching historical e-shopper browsing activity sessions as electronic shopping cart predictions (represented in FIG. 2 as electronic shopping cart predictions 1, 2, and 3). Note this number is meant simply as an example, and other numbers of electronic shopping cart predictions (e.g., for each interaction) are possible.

Example Flow Diagrams

Figure 3:
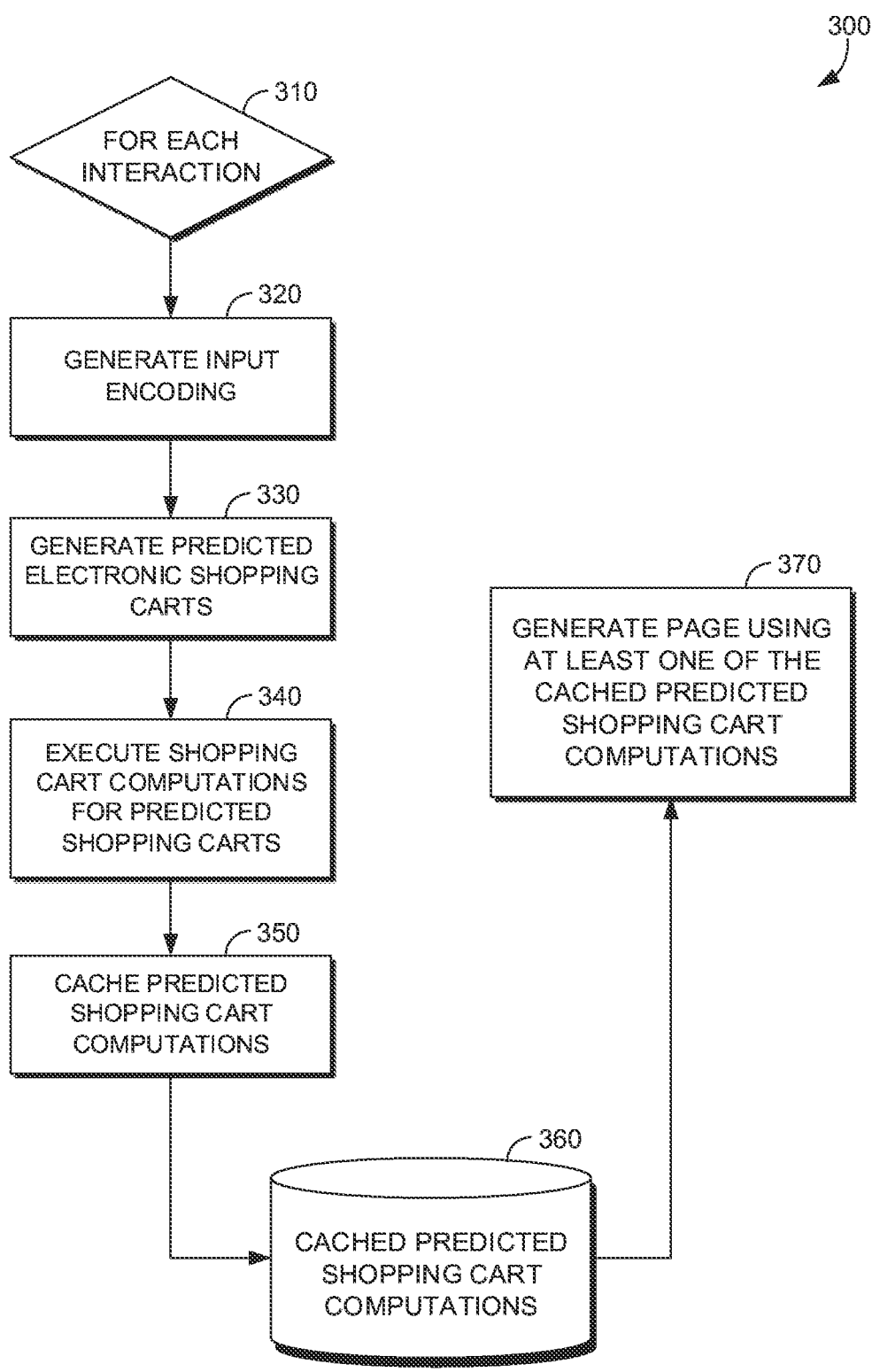
FIG. 3 is a flow diagram showing a method for generating and caching computations for predicted electronic shopping carts, in accordance with embodiments of the present disclosure.
Figure 4:
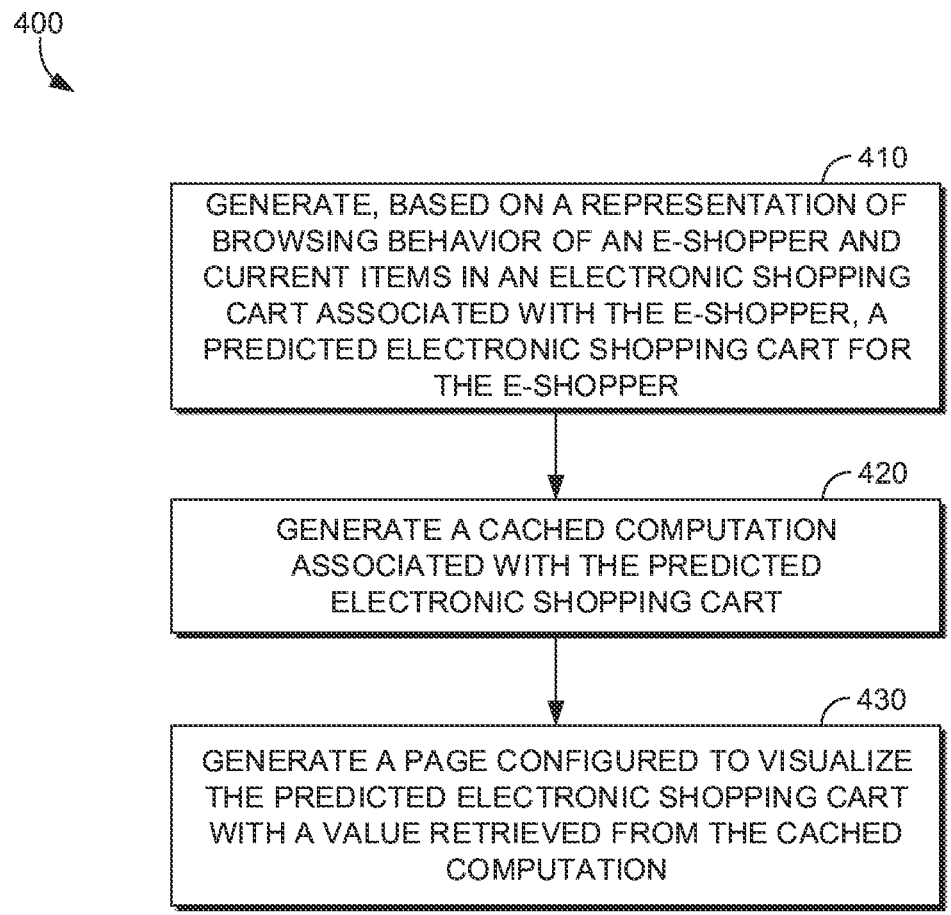
FIG. 4 is a flow diagram showing a method for generating a page configured to visualize a predicted electronic shopping cart using a cached computation, in accordance with embodiments of the present disclosure.

With reference now to FIGS. 3-4, flow diagrams are provided illustrating methods for generating predicted electronic shopping carts. Each block of the methods 300 and 400 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

FIG. 3 is a flow diagram showing a method 300 for generating and caching computations for predicted electronic shopping carts, in accordance with embodiments of the present disclosure. Block 310 indicates that, for each interaction between an e-shopper and an e-commerce application, a processing device(s) implementing the present disclosure executes blocks 320-350. At block 320, the processing device(s) generates an input encoding (i) a sequence of preceding interactions between the e-shopper and the e-commerce application, and (ii) the current contents of the e-shopper's electronic shopping cart. At block 330, the processing device(s) generates predicted electronic shopping carts that contain items the e-shopper is predicted to purchase based on the input encoding. In some embodiments, this prediction is done using content, collaborative, and/or hybrid filtering based on similarities between the e-shopper's interactions and historical e-shopper interactions and/or based on similarities between the e-shopper's current electronic shopping cart and historically purchased electronic shopping carts. At block 340, the processing device(s) executes shopping cart computations for one or more predicted shopping carts (e.g., those having predicted confidence levels or prediction scores above a threshold, top N predicted shopping carts having the highest confidence levels or prediction scores). At block 350, the processing device(s), the processing device(s) caches the predicted shopping cart computations in database 360.

As such, at block 370, the processing device(s) generates a page using at least one of the cached predicted shopping cart computations from database 360. In one example, the page includes a carousel of different predicted electronic shopping carts, where the e-shopper can scroll through the different predicted electronic shopping carts represented in the carousel. In some embodiments, each predicted electronic shopping cart in the carousel is presented with one or more values that were retrieved from database 360, such as a representation of the predicted combination of items in that predicted electronic shopping cart, price total for the items in that predicted electronic shopping cart, any promotions applied, amount saved, taxes, deltas from the current cart contents (e.g., additional items that would be added), and/or the like. Additionally or alternatively, each predicted electronic shopping cart in the carousel is configured to pop-up one or more values that were retrieved from database 360, for example, in response to input hovering over a corresponding predicted electronic shopping cart represented in the carousel.

In another example embodiment, when the e-shopper adds a predicted item(s) to his or her electronic shopping cart, thereby modifying the electronic shopping cart to correspond to a previously predicted electronic shopping cart, and/or the e-shopper inputs a command to view an electronic shopping cart that corresponds to a previously predicted electronic shopping cart, corresponding cached predicted shopping cart computations 360 are retrieved and used to generate a page that summarizes the contents of the electronic shopping cart. Since the applicable shopping cart computations were previously executed, the time it takes to respond to the e-shopper command is reduced over prior techniques.

FIG. 4 is a flow diagram showing a method 400 for generating a page configured to visualize a predicted electronic shopping cart using a cached computation, in accordance with embodiments of the present disclosure. At block 410, a processing device(s) implementing the present disclosure generates, based on a representation of browsing behavior of an e-shopper and current items in an electronic shopping cart associated with the e-shopper, a predicted electronic shopping cart for the e-shopper. At block 420, the processing device(s) generates a cached computation associated with the predicted electronic shopping cart. At block 430, the processing device(s) generates a page configured to visualize the predicted electronic shopping cart with a value retrieved from the cached computation.

Example Operating Environment

Figure 5:
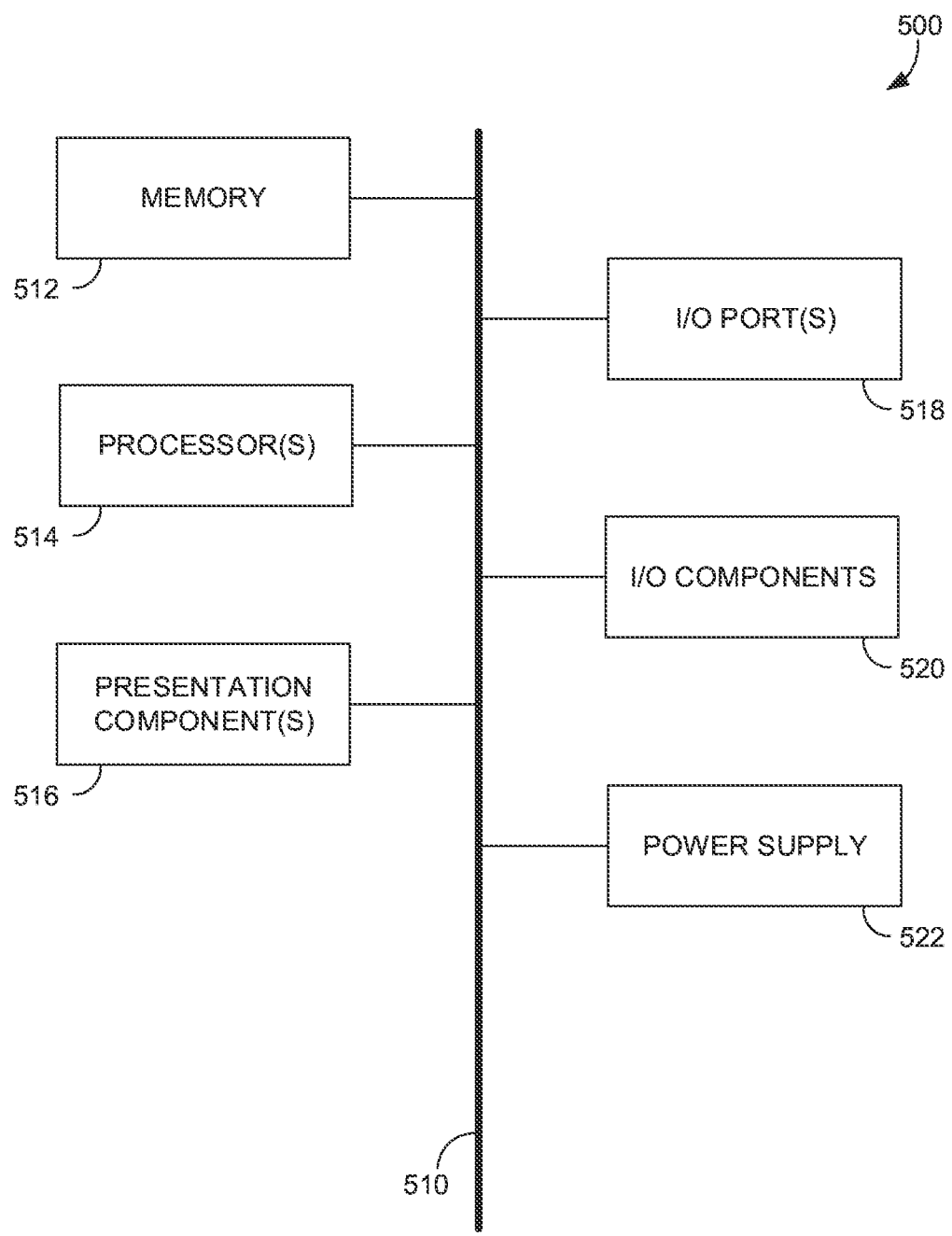
FIG. 5 is a block diagram of an example computing environment suitable for use in implementing embodiments of the present disclosure.

Having described an overview of embodiments of the present disclosure, an example operating environment in which some embodiments of the present disclosure are implemented is described below in order to provide a general context for various aspects of the present disclosure. Referring now to FIG. 5 in particular, an example operating environment for implementing embodiments of the present disclosure is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules (e.g., including or referencing routines, programs, objects, components, libraries, classes, variables, data structures, etc.) refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 5, computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in some cases, it is not possible to delineate clear boundaries for different components. In this case, metaphorically, the lines would be grey and fuzzy. As such, the diagram of FIG. 5 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 5 and a "computing device."

Computing device 500 typically includes a variety of computer-readable media. Computer-readable media can be any available media that can be accessed by computing device 500 and includes both volatile and nonvolatile media, and removable and non-removable media. By way of non-limiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 500 includes one or more processors that read data from various entities such as memory 512 or I/O components 520. Presentation component(s) 516 present data indications to a user or other device. Example presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 500. In some cases, computing device 500 is equipped with depth cameras, such as stereoscopic camera systems, infrared camera systems, RGB camera systems, touchscreen technology, and combinations of these, for gesture detection and recognition. Additionally or alternatively, the computing device 500 is equipped with accelerometers or gyroscopes that enable detection of motion, and in some cases, an output of the accelerometers or gyroscopes is provided to the display of computing device 500 to render immersive augmented reality or virtual reality.

Embodiments described herein support prediction and computation of electronic shopping carts. The components described herein refer to integrated components of an electronic shopping cart prediction and computation system. The integrated components refer to the hardware architecture and software framework that support functionality using the system. The hardware architecture refers to physical components and interrelationships thereof and the software framework refers to software providing functionality that can be implemented with hardware embodied on a device.

In some embodiments, the end-to-end software-based system operates within the components of the system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present disclosure.

Some embodiments are described with respect a neural network, a type of machine-learning model that learns to approximate unknown functions by analyzing example (e.g., training) data at different levels of abstraction. Generally, neural networks model complex non-linear relationships by generating hidden vector outputs along a sequence of inputs. In some cases, a neural network includes a model of interconnected digital neurons that communicate and learn to approximate complex functions and generate outputs based on a plurality of inputs provided to the model. In various implementations, a neural network includes any of a variety of deep learning models, including convolutional neural networks, recurrent neural networks, deep neural networks, and deep stacking networks, to name a few examples. In some embodiments, a neural network includes or otherwise makes use of one or more machine learning algorithms to learn from training data. In other words, a neural network can include an algorithm that implements deep learning techniques such as machine learning to attempt to model high-level abstractions in data.

Although some implementations are described with respect to neural networks, some embodiments are implemented using other types of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present disclosure is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when executed by one or more computing devices, cause the one or more computing devices to perform operations comprising:
generating, by a shopping cart prediction engine of an e-commerce application, and based on a representation of browsing behavior of an e-shopper and current items in an electronic shopping cart associated with the e-shopper, a predicted electronic shopping cart for the e-shopper;
generating, by a shopping cart computation component of the e-commerce application, a computation associated with the predicted electronic shopping cart;
caching, by the shopping cart computation component of the e-commerce application, the computation associated with the predicted electronic shopping cart as a cached computation associated with the predicted electronic shopping cart; and
in response to input by the e-shopper instructing an update modifying the electronic shopping cart to correspond to the predicted electronic shopping cart, generating, by the e-commerce application, a page configured to visualize the predicted electronic shopping cart using a value from the cached computation that was cached prior to the input.

2. The one or more non-transitory computer storage media of claim 1, wherein the shopping cart prediction engine is configured to generate a plurality of predicted electronic shopping carts in response to each interaction of the e-shopper with the e-commerce application and the shopping cart computation component is configured to cache a plurality of corresponding computations as a plurality of corresponding cached computations, each of the plurality of predicted electronic shopping carts comprising a corresponding predicted combination of items, each of the plurality of corresponding cached computations associated with a corresponding one of the plurality of predicted electronic shopping carts; and wherein the value is from one of the plurality of cached computations that was cached prior to the input.

3. The one or more non-transitory computer storage media of claim 1, wherein the shopping cart computation component is configured to generate and cache a corresponding price total for each predicted electronic shopping cart generated by the shopping cart prediction engine with a predicted confidence level above a designated threshold.

4. The one or more non-transitory computer storage media of claim 1, wherein the e-commerce application is configured to determine to delete or permit deleting the cached computation from cache upon abandonment of the electronic shopping cart or upon a designated number of interactions of the browsing behavior by the e-shopper subsequent to an initial interaction of the browsing behavior that triggered generation of the cached computation.

5. The one or more non-transitory computer storage media of claim 1, wherein the shopping cart prediction engine is configured to generate the predicted electronic shopping cart based on transforming a time series signal encoding interaction features for a sequence of interactions of the browsing behavior into a fixed length signal by a transformer model, and feeding a representation of the fixed length signal into a recommender system.

6. The one or more non-transitory computer storage media of claim 1, wherein the shopping cart prediction engine is configured to generate the predicted electronic shopping cart based on feeding the representation of the browsing behavior and the current items in the electronic shopping cart into a recommender system.

7. The one or more non-transitory computer storage media of claim 1, wherein the shopping cart computation component is configured to trigger parallel computations for different predicted electronic shopping carts on different processors.

8. The one or more non-transitory computer storage media of claim 1, wherein the page comprises a carousel of different predicted electronic shopping carts, wherein the carousel is configured to cause, in response to input by the e-shopper hovering over a selected predicted electronic shopping cart in the carousel, presentation of a corresponding cached price total for the selected predicted electronic shopping cart.

9. The one or more non-transitory computer storage media of claim 1, wherein generating the page comprises determining not to re-compute the computation and cache the computation in response to the input by the e-shopper instructing the update that modifies the electronic shopping cart to correspond with the predicted electronic shopping cart.

10. The one or more non-transitory computer storage media of claim 1, wherein generating the page is in response to input by the e-shopper requesting to view the electronic shopping cart, and wherein the shopping cart computation component is configured to retrieve the value of the cached computation from cache subsequent to determining the update modifying the electronic shopping cart to correspond to the predicted electronic shopping cart responsive to the input by the e-shopper.

11. The one or more non-transitory computer storage media of claim 1, wherein the shopping cart computation component is configured to generate the cached computation based on a determination that computational resources are available to generate the cached computation.

12. A method comprising:
generating, by a shopping cart prediction engine of an e-commerce application, a predicted electronic shopping cart for an e-shopper;
generating, by a shopping cart computation component of the e-commerce application, a computation associated with the predicted electronic shopping cart;
caching, by the shopping cart computation component of the e-commerce application, the computation associated with the predicted electronic shopping cart as a cached computation associated with the predicted electronic shopping cart; and
in response to input by the e-shopper instructing an update modifying an electronic shopping cart to correspond to the predicted electronic shopping cart, generating, by the e-commerce application, a page configured to present the predicted electronic shopping cart using a price total for the predicted electronic shopping cart of the cached computation that was cached prior to the input.

13. The method of claim 12, wherein the shopping cart prediction engine is configured to generate a plurality of predicted electronic shopping carts in response to each interaction of the e-shopper with the e-commerce application and the shopping cart computation component is configured to cache a plurality of corresponding computations as a plurality of corresponding cached computations, each of the plurality of predicted electronic shopping carts comprising a corresponding predicted combination of items, each of the plurality of corresponding cached computations associated with a corresponding one of the plurality of predicted electronic shopping carts; and wherein the price total is from one of the plurality of cached computations that was cached prior to the input.

14. The method of claim 12, wherein the shopping cart computation component is configured to generate and cache a corresponding price total for each predicted electronic shopping cart generated by the shopping cart prediction engine with a predicted confidence level above a designated threshold.

15. The method of claim 12, wherein the e-commerce application is configured to determine to delete or permit deleting the cached computation from cache upon abandonment of a current electronic shopping cart of the e-shopper or upon a designated number of interactions by the e-shopper subsequent to an initial interaction that triggered generation of the cached computation.

16. The method of claim 12, wherein the shopping cart computation component is configured to trigger parallel computations for different predicted electronic shopping carts on different processors.

17. The method of claim 12, wherein the page comprises a carousel of different predicted electronic shopping carts, wherein the carousel is configured to cause, in response to input by the e-shopper hovering over a selected predicted electronic shopping cart in the carousel, presentation of a corresponding cached price total for the selected predicted electronic shopping cart.

18. The method of claim 12, wherein generating the page comprises determining not to re-compute the computation and cache the computation in response to the input by the e-shopper instructing the update that modifies a current electronic shopping cart associated with the e-shopper to correspond with the predicted electronic shopping cart.

19. The method of claim 12, wherein generating the page is in response to input by the e-shopper requesting to view a current electronic shopping cart associated with the e-shopper, and wherein the shopping cart computation component is configured to retrieve the price total of the cached computation from cache subsequent to determining the update modifying the electronic shopping cart to correspond to the predicted electronic shopping cart responsive to the input by the e-shopper.

20. A computer system comprising one or more processors and memory configured to provide computer program instructions to the one or more processors, the computer program instructions comprising e-commerce application, the e-commerce application comprising:
 a shopping cart prediction engine configured to generate based on a representation of browsing behavior of an e-shopper and current items in an electronic shopping cart associated with the e-shopper, a predicted electronic shopping cart for the e-shopper; and
 a shopping cart computation component configured to:
  generate a computation associated with the predicted electronic shopping cart; and
  cache the computation associated with the predicted electronic shopping cart as a cached computation associated with the predicted electronic shopping cart;
 wherein the e-commerce application is configured to, in response to input by the e-shopper instructing an update modifying the electronic shopping cart to correspond to the predicted electronic shopping cart, generate a page configured to visualize the predicted electronic shopping cart using a value of the cached computation that was cached prior the input.

* * * * *

UNITED STATES PATENT AND TRADEMARK OFFICE
CERTIFICATE OF CORRECTION

| | | |
|---|---|---|
| PATENT NO. | : 11,935,085 B1 | Page 1 of 1 |
| APPLICATION NO. | : 17/903360 | |
| DATED | : March 19, 2024 | |
| INVENTOR(S) | : Michele Saad et al. | |

It is certified that error appears in the above-identified patent and that said Letters Patent is hereby corrected as shown below:

In the Claims

Column 22, Claim 20, Line 40:
In the line reading "was cached prior the input." should read -- was cached prior to the input. --

Signed and Sealed this
Fourteenth Day of May, 2024

Katherine Kelly Vidal
*Director of the United States Patent and Trademark Office*